June 16, 1942.  G. E. NERNEY  2,286,435
EYEGLASS FRAME CONSTRUCTION AND METHOD OF MAKING THE SAME
Filed April 24, 1941
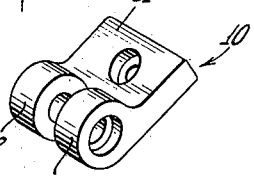
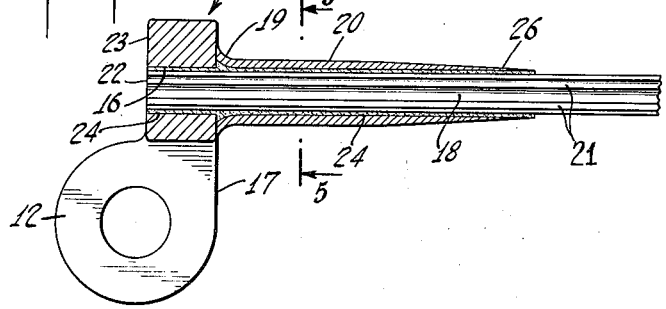
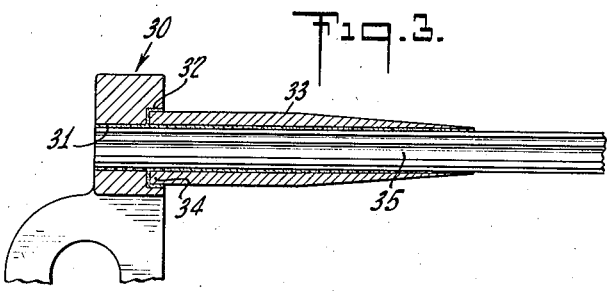
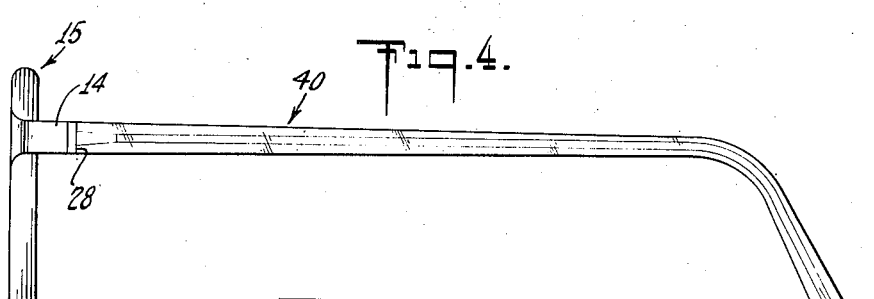
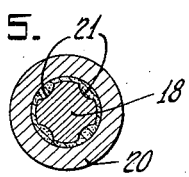
INVENTOR
George E. Nerney
BY
Blair, Curtis & Hayward
ATTORNEY Patented June 16, 1942

2,286,435

UNITED STATES PATENT OFFICE 2,286,435

EYEGLASS FRAME CONSTRUCTION AND METHOD OF MAKING THE SAME

George E. Nerney, Attleboro, Mass., assignor to Bay State Optical Company, Attleboro, Mass., a corporation of Maine Application April 24, 1941, Serial No. 390,048

6 Claims. (Cl. 88—52)

This invention relates to non-metallic eyeglass frame construction and to a method of making the same.

One of the objects of this invention is to provide a temple construction which is simple, thoroughly practical, and durable. Another object is to provide a construction of the above character which will be sturdy and well able to withstand hard usage. Another object is to provide a construction of the above character which will be neat and attractive in appearance. Another object is to provide a construction of the above character, the manufacture of which will be economical both from the standpoint of labor and materials used. A further object is to provide a construction of the above character which will be especially strong in certain vulnerable spots of the above type of construction. A still further object is to provide a construction of the above character which may be assembled with extreme ease and few tools. Another object is to provide a method of assembling the parts of the above construction which will be economical and be productive of a sturdy construction. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawing in which is shown several of the various possible embodiments of this invention:

Figure 1 is a perspective view, on an enlarged scale, of a part of the temple construction shown in Figure 4;

Figure 2 is a vertical section, on an enlarged scale, showing the metal parts of the temple shown in Figure 4 in assembled relationship;

Figure 3 is a vertical section, on an enlarged scale, showing a modification of the construction shown in Figure 2;

Figure 4 is a side elevation of a non-metallic eyeglass frame having the temple construction embodying the invention connected thereto; and, Figure 5 is a vertical section taken on the line 5—5 of Figure 2.

Similar reference characters refer to similar parts throughout the several views of the drawing.

As conducive to a clearer understanding of certain features of this invention, it might here be pointed out that the construction of a non-metallic temple having a hinge plate securely connected to the temple reinforcing rod has met with considerable difficulty. This difficulty has arisen because of the heavy strains that the connection between the hinge plate and the temple reinforcing rod is required to absorb. Some of these strains are caused during adjustment of the temples by the retailer, who, to make the adjustment, grips the temple and endpiece and then bends the rod and hinge until the temple is properly positioned. The strain resulting from this must necessarily fall on the connection between the hinge plate and the temple rod. Other strains result from actual use, as frames are usually handled by their temples, and this also places a strain directly upon the above-mentioned connection. These strains very often result in the loosening or breakage of the connection, which causes the user both inconvenience and the expense of repairs. It is accordingly another object of this invention to overcome the above-mentioned difficulties as well as many others.

Referring now to Figures 1 and 2, a hinge plate, generally indicated at 10, is shown which includes a flat body portion 11 having a pair of knuckles 12 and 13 formed thereon. Knuckles 12 and 13 are adapted to be connected in any suitable manner to a knuckle (not shown) mounted on the endpiece 14 of the eyeglass frame, generally indicated at 15 (Figure 4.) A hole 16 extends through the center portion of hinge plate body 11 and its axis is perpendicular to the surface of the hinge plate contacting the end of the non-metallic part of the temple when the temple parts are in assembled relationship. The end of the temple reinforcing rod 18 extends through and is secured in this hole, all as will be described more fully hereinafter.

A sleeve, generally indicated at 20, is formed from tubing having its interior flushed with solder. This sleeve is preferably of sufficient length to extend a substantial distance along temple reinforcing rod 18 (Figure 2). Its inner end 19 is preferably flanged outwardly so that it contacts hinge plate 10 a substantial distance from the edge of hole 16, and the tube tapers to a fine edge at its outer end 26. Temple rod 18 is preferably provided with a plurality of grooves 21 (Figures 2 and 5) which extend longitudinally thereof throughout the length of the rod for purposes which will be disclosed more fully hereinafter.

In assembly, rod 18 is passed through the sleeve and hole 16 so that its end 22 is flush with the outer surface 23 (Figure 2) of hinge plate 10, and the flanged end 19 of the sleeve abuts against hinge plate 10. These parts are held in this relationship in a soldering jig which heats plate 10, solder-flushed sleeve 20, and the portion of rod 18 which contacts these parts. The heat placed upon plate 10 is preferably greater than that placed upon sleeve 20, and thus, after the solder within the sleeve melts, it is drawn to the left as viewed in Figure 2 so that the solder 24 secures sleeve 20 to rod 18, the end of rod 18 in hole 16, and the flanged end of sleeve 20 to plate 10. Thus, a substantial portion of the rod is connected to the hinge plate, and this coacts with the flanged end 19 of sleeve 20 to form a strong and durable connection.

During the soldering, grooves 21 in rod 18 aid the flow of solder toward plate 10 by providing passages through which the solder passes, and after the solder hardens, the ridges of solder extending into these grooves counteract twisting strains upon the connection. Sleeve 20, rod 18, and plate 10 are all preferably made of K-Monel, a type of alloy which does not anneal when heated. Thus, by using this type of alloy, the strength of the metal in the finished product is not affected by the soldering heat.

Referring to Figure 3 in which a modification of the embodiment shown in Figure 2 is shown, hinge plate 30 is of substantially the same construction as plate 10 having a hole 31 extending therethrough. The inner end of hole 31, however, has a counterbored portion 32 which has a diameter slightly greater than sleeve 33 and thus is adapted to receive the inner end 34 of the sleeve. The outer end of the sleeve is tapered in a manner similar to sleeve 20. In assembly, the sleeve, plate, and rod 35 are held together in a soldering jig and heat is applied in substantially the same manner as described hereinabove with regard to the preferred embodiment. The solder secures the sleeve to the rod, the rod in the hole, and the end of the sleeve in the counterbored portion of the hole. Thus, the rod and sleeve are secured to the plate in such a manner that a strong and durable connection is formed.

After the metal parts are assembled (Figures 2 and 3), the reinforcing rod is driven into a strip of non-metallic material, such as zylonite, so that the end 28 of the strip abuts against the temple hinge plate. Then the zylonite casing or the temple is machined and shaped to form the completed temple, generally indicated at 40 (Figure 4). In this figure, it may be seen that the reinforcing rod extends throughout the length of the temple and that the reinforcing sleeve is embedded in its inner end, thus providing a strong non-metallic temple construction which is neat and attractive in appearance.

Thus, a method has been disclosed for assembling a strong and durable temple construction which is well adapted to withstand hard usage. By having the temple rod extend through and soldered to the hinge plate and by making both of these parts of K-Monel, an exceedingly strong connection between the hinge plate and temple reinforcing rod is formed. This connection is reinforced by sleeve 20, which is secured to both the temple rod and to the hinge plate and thus strengthens the weakest point in non-metallic temple construction—namely, the point of connection between the temple rod and the hinge plate. Furthermore, the soldering of the end of sleeve 20 in the counterbored portion of hole 16 materially aids the strength of this connection. Thus, a practical and efficient temple construction and method of making the same have been disclosed in which the several objects hereinabove described, as well as many others, have been successfully accomplished.

As many possible embodiments may be made of the mechanical features of the above invention and as the art herein described might be varied in various parts, all without departing from the scope of the invention, it is to be understood that all matter hereinbefore set forth, or shown in the accompanying drawing, is to be interpreted as illustrative and not in a limiting sense.

I claim:

1. In non-metallic temple construction, in combination, a metal hinge plate having a hole therein, a metal temple reinforcing rod having an end extending into said hole, a metal sleeve mounted on said rod adjacent said plate, means securing said sleeve to said rod and said rod and sleeve to said plate, and a non-metallic casing covering said reinforcing member.

2. In non-metallic temple construction, in combination, a metal hinge plate having a hole therein, a metal temple reinforcing rod extending into said hole, a sleeve mounted on said rod, a flange portion formed on one end of said sleeve and abutting against said plate, means securing said sleeve to said rod, said rod in said hole, and the flange portion of said sleeve to said hinge plate, and a non-metallic casing covering said reinforcing member.

3. In non-metallic temple construction, in combination, a metal hinge plate having a hole therein, one end of said hole being counterbored, a metal temple reinforcing rod extending into said hole, a sleeve mounted on said rod and having an end extending into the counterbored portion of said hole, means securing said sleeve to said rod, said rod to the side wall of said hole, and the end of said sleeve to the counterbored portion of said hole, and a non-metallic casing covering said reinforcing member.

4. In non-metallic temple construction, in combination, a metal hinge plate having a hole therein, a metal temple reinforcing rod having a plurality of grooves formed in its outer surface extending longitudinally thereof, said temple reinforcing rod having an end extending into said hole, a metallic sleeve mounted on said rod adjacent said plate, means securing said sleeve to said rod and said rod and sleeve to said plate, said last-mentioned means filling the grooves in the portion of said rod positioned in said hinge plate hole, and a non-metallic casing covering said reinforcing member.

5. The herein described art which includes the steps of: forming a hinge plate, boring a hole in said hinge plate, forming a temple reinforcing rod having an end adapted to fit into said hinge plate hole, forming a sleeve from solder-flushed tubing, flanging one end of said sleeve outwardly and tapering the other end thereof to a fine edge, placing said sleeve on said rod so that its flanged end abuts against said plate, applying soldering heat to said parts, the heat applied to said hinge plate being greater than the heat applied to said sleeve whereby solder is drawn from said solder-flushed sleeve to the points of connection of said sleeve and said rod to said hinge plate, driving said rod into a strip of non-metallic material, and forming said non-metallic material to the proper shape.

6. The herein described art which includes the steps of: forming a hinge plate, boring a hole in said hinge plate, forming a temple reinforcing rod having an end adapted to fit into said hinge plate hole, placing a solder-flushed sleeve on said rod, introducing the end of said rod into said hinge plate hole, applying soldering heat to said sleeve and said hinge plate, the heat applied to said hinge plate being greater than the heat applied to said sleeve, whereby solder is drawn from said solder-flushed sleeve into the space between the side wall of said hole and the end of said rod, driving said rod into a strip of non-metallic material, and forming said non-metallic material to the proper shape.

GEORGE E. NERNEY.